United States Patent [19]

Kittle

[11] 3,995,016

[45] Nov. 30, 1976

[54] PROCESS FOR THERMOCHEMICAL CLEAVAGE OF WATER INTO HYDROGEN AND OXYGEN

[75] Inventor: Paul A. Kittle, Gardenville, Pa.

[73] Assignee: Rohm and Haas Company, Philadelphia, Pa.

[22] Filed: Dec. 4, 1975

[21] Appl. No.: 637,807

Related U.S. Application Data

[63] Continuation-in-part of Ser. No. 553,363, Feb. 26, 1975, abandoned.

[52] U.S. Cl. .............................. 423/579; 423/475; 423/486; 423/500; 423/648
[51] Int. Cl.² ..................... C01B 13/00; C01B 1/05
[58] Field of Search .......... 423/579, 648, 486, 462, 423/475, 500

[56] References Cited

UNITED STATES PATENTS

| | | | |
|---|---|---|---|
| 1,324,761 | 12/1919 | Carter | 423/500 |
| 3,839,550 | 10/1974 | Wentorf, Jr. | 423/579 |
| 3,929,980 | 12/1975 | Abraham et al. | 423/648 |

OTHER PUBLICATIONS

"Hydrogen Sought via Thermochemical Methods", Chemical and Engineering News, Sept. 3, 1973, pp. 32 & 33.

Mellor, "Inorganic & Theoretical Chemistry", Supplement II, Part I, p. 857, Longmans, Green & Company, 1956.

*Primary Examiner*—Earl C. Thomas

[57] ABSTRACT

A process for the production of hydrogen and oxygen by the cleaving of water which involves the steps of (a) reacting water vapor and iodine vapor in the presence of cuprous iodide at a temperature of 125° to 450° C. to form hydrogen iodide and a solid oxygen-iodine intermediate; (b) recovering the hydrogen iodide formed in step (a); and (c) thermally or photolytically decomposing the recovered hydrogen iodide into hydrogen and iodine, continuously collecting and removing the hydrogen so formed.

7 Claims, No Drawings

PROCESS FOR THERMOCHEMICAL CLEAVAGE OF WATER INTO HYDROGEN AND OXYGEN

This application is a continuation-in-part of U.S. Ser. No. 553,363, filed on Feb. 26, 1975, and now abandoned.

This invention relates to a process for obtaining hydrogen and oxygen from water in a series of chemical and thermal reactions.

Fossils fuels, petroleum in particular, supply a reducing agent that can be oxidized by the oxygen in the air to yield energy. This feature allows electrical power generation, all forms of mechanized transportation, heating and air conditioning and the chemical process industry to exist. It must be recognized that fossils fuels are unique in that they are still available in quantity and that their oxidation products are generally compatible with existing environmental standards. The reducing capacity of fossil fuels can be divided into two distinct parts: (1) the reducing action of carbon, such as coal, as exemplified by coke reduction of iron ore, and burning of coal for heat; and (2) the reducing action of hydrogen as exemplified by the petrochemical industry use of synthesis gas, a mixture of reducing agent and a carbon base, $H_2 + CO$. The truly important portion of synthesis gas is hydrogen since the carbon base can be obtained from the atmosphere, from carbon dioxide via reduction with hydrogen. Therefore, it can be concluded that having hydrogen is ultimately equivalent to having synthesis gas which is essentially equal to having natural gas.

It is significant to note that about 60% of all hydrogen consumed in the United States is used to produce two simple, yet essential products: ammonia and methanol. The former is mainly used, either directly or indirectly for the production of nitrogenous fertilizers, the importance of which, in light of present conditions of food production in all countries, cannot be emphasized enough. Methanol can be readily adapted to fuel existing internal combustion engines, to fuel electrical generating facilities and to potentially fuel home furnaces presently operating on fossil fuels. Additionally, hydrogen could be adapted for use as an agent for reducing iron ore rather than the presently used coal.

The present and steadily increasing importance of hydrogen makes an efficient hydrogen producing process highly desirable. In order to be of value, the cost involved must be competitive with present fossil fuel and natural gas production. To date, hydrogen has been produced from natural gas, naphtha, residual fuel oil, coal and water. Stanford Research Institute Process Economics Report 32A, of December, 1973 is a review of eight commercial processes for production of hydrogen from the above-enumerated sources, and its conclusion based on an annual capacity of 16,500,000 standard cubic feet, is that steam reforming of natural gas is the least expensive process based on both capital and operating costs, while water electrolysis is the most expensive process. With cost factors of $0.50/1000 standard cubic feet for natural gas, $10.00/ton for coal and $0.01/kwh for electricity for electrolysis, the final price of hydrogen is affected accordingly. Thus, the cost of natural gas feed is 37% of the cost of the steam reformed hydrogen, the cost of the coal is 19% in the coal gasification process, and the electricity is 92% of the cost of the hydrogen produced by electrolysis. Thus, a process is needed for the production of hydrogen that is not dependent upon petrolembased feedstocks, whose price is becoming prohibitive, and yet still be economically attractive. A process has been devised which does in fact accomplish these objectives and which can provide elemental hydrogen and oxygen from water by thermochemical means vice electrolysis.

This new process for obtaining hydrogen and oxygen from water involves the use of iodine in a series of chemical and thermal reactions, more particularly, the following reactions:

$$3H_2O + 3I_2 = 5HI + HIO_3 \qquad (1)$$

$$2HIO_3 \underset{=}{\Delta} H_2O + I_2O_5 \qquad (2)$$

$$2I_2O_5 \underset{=}{\Delta} 2I_2 + 5O_2 \qquad (3)$$

$$2HI \underset{=}{\Delta /h\nu} H_2 + I_2 \qquad (4)$$

The process for producing hydrogen from water includes the steps of: (a) reacting water vapor and iodine vapor in the presence of cuprous iodide at temperature of 125° to 450° C. to form hydrogen iodide and a solid oxygen-iodine intermediate (it is postulated that this oxygen-iodine intermediate may be either iodic acid or its anhydride, depending on whether the reaction temperature is low enough to allow iodic acid to exist or whether the temperature is high enough to dehydrate the latter to its anhydride iodine pentoxide); (b) recovering the hydrogen iodide formed in step (a); and (c) decomposing, thermally or photolytically, the recovered hydrogen iodide into hydrogen and iodine, continuously collecting and removing the hydrogen so formed. Further steps can produce oxygen from the oxygen-iodine intermediate by first (d) recovering the intermediate; (e) solubilizing the recovered intermediate in water to form an aqueous solution and (f) thermally decomposing the solution to obtain water vapor, oxygen and iodine, continually collecting and removing the oxygen so formed. The iodine is totally recoverable and thus allows for a continuous process in which its consumption is held at a minimum. An important aspect is that the reaction is conducted at low temperatures, such as at a temperature of about 125° to 450° C. Other known thermochemical water cleaving reactions generally involve at least one high temperature step, often in the range of 700°–1000° C. This makes the whole process very unattractive because of the requirement of high heat input which is not necessarily balanced by the amount of potential energy obtained in the form of hydrogen. Further, such known processes are rather complex involving numerous intermediate steps with involved reactions. The present invention presents a process which is simple, having a minimum of intermediate steps; efficient, as the initial hydrolysis is rapid and complete as are the other reactions; and is carried out at low temperatures.

The crux of the process resides in the hydrolysis of iodine, and the ability of the iodine derivatives produced thereby to decompose into their constituent elements cleanly and completely. Because of its high heat of formation, water is a correspondingly difficult substance to decompose into constituent elements. Thus, indirect routes to the elements are necessary in order to avoid the problem of high heat of formation. The use of and success of iodine in the above-enumerated sequence of steps is dependent on a number of factors, of which three are most important: the hydrolysis step, subsequent reactions of oxyacids and the production of hydrogen. Three halogens, iodine, bromine and chlorine, have been examined to determine their hydrolysis. Both chlorine and bromine are hydrolyzed in water to a far greater degree than iodine, the order being $K_{Cl_2} > K_{Br_2} > K_{I_2}$. In all cases, however, the degree of hydrolysis is small and for the hydrolysis to proceed, the removal of one or both of the products is necessary. However, iodine disproportionates more readily to $HIO_3$ plus HI than chlorine or bromine to their corresponding products: $k_{I_2} > k_{Br_2} > k_{Cl_2}$. Thus, the hydrolysis of iodine is:

$$I_2 + H_2O \rightleftharpoons HIO + HI \qquad (5)$$

Hypoiodous acid is unisolable and is converted to iodic acid roughly 30,000 times as fast as the corresponding bromine compound. Thus, because HIO proceeds rapidly to a solid postulated to be $HIO_3$ and HI is formed as a gas, there is an effective removal of products from the reaction and consequently an upset of the equilibrium to the right.

The chemistry of the oxyacids and their oxides is quite complicated. The oxyacids of chlorine and bromine behave in a similar manner but are qualitatively different from those of iodine. Both HOCl and HOBr are somewhat stable but may be further oxidized giving $HClO_3$ and $HBrO_3$. Unlike $HIO_3$, these two acids cannot be isolated and attempts to concentrate them brings about their decomposition. For example, in the case of $HClO_3$ the following occurs:

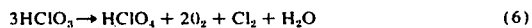

$$3HClO_3 \rightarrow HClO_4 + 2O_2 + Cl_2 + H_2O \qquad (6)$$

The perchloric acid ($HClO_4$) is unstable in concentrated solution yielding water, oxygen and chlorine dioxide — often explosively. Bromic acid ($HBrO_3$) decomposition also occurs but $HBrO_4$ is not formed and does not exist. Thus, only iodine provides an isolable oxyacid which can be further dehydrated and decomposed to yield oxygen and iodine.

The reactions of the hydrogen halides are of great theoretical and practical interest and their behavior has been well documented. With a heat of formation (gaseous) of +6.20 kcal/mole, the decomposition of hydrogen iodide will be an exothermic process. Hydrogen chloride (gaseous) and hydrogen bromide gaseous having heats of formation of −22.06 and −8.66 respectively, will require energy to bring about decomposition. In all cases, removal of products will be necessary in order to drive the reaction to completion. Due to their high activation energies, hydrogen halide decompositions will occur at slow rates, which then require catalysis in order to achieve accelerated decomposition. HBr and HCl have been synthesized from their elements over various catalysts and the latter would appear to be useful in decomposition as well. Some of these catalysts involve the use of charcoal or charcoal and iron at temperatures of about 500°–600° C. In addition to a catalyzed thermal decomposition, hydrogen iodide can be photolytically decomposed. Both HCl and HBr absorb light, but at higher energies than HI. HBr is said to dissociate with light of 320 nanometers, with other reports listing maximum wavelenghts of 310 and 270 nanometers. Since minimum solar wavelengths are approximately 300 nanometers such a process would be rather inefficient. Hydrogen iodide, however, shows 100% decomposition to hydrogen and iodine at a wavelength of about 400 nanometers. Thus, hydrogen iodide is perfect for the production of hydrogen either thermally or photolytically.

The basic reaction path involves the reaction of water vapor with iodine vapor in the presence of a cuprous iodide catalyst at a temperature of about 125° to 450° C. to form gaseous hydrogen iodide and a solid oxygen-iodine intermediate. As a practical matter, the cuprous iodide catalyst is packed into a reactor tube preferably constructed of glass, and brought up to temperature. Iodine vapor in a carrier such as argon or the water vapor is then passed through the reactor. A suitable flow rate for the reactants is about 200–300 cc/min. at standard temperature and pressure. The reaction can be run at atmospheric pressure, however, pressures up to 50 pounds per square inch gauge can be used. Increased pressures may be helpful in keeping the iodine in the vapor state within the reactor.

The gaseous hydrogen iodide produced by the reaction and exiting from the reactor is collected and then decomposed either in the gaseous state or entrapped in a suitable solvent and processed in the solvated condition. The solid intermediate remaining in the reador can either be solvated from the reactor by solubilizing in water to yield an aqueous solution or it can be decomposed in situ by pyrolysis which yields water vapor, oxygen and iodine vapor. The aqueous solution can likewise be decompoed by heating to yield the same products. Decomposition of the solution can even be foregone as it is a powerful oxidizing agent which can be effectively used in further chemical synthesis.

The splitting of the recovered hydrogen iodide into hydrogen and iodine is important, as this gas must be dissociated completely, cleanly and efficiently. As mentioned earlier, an uncatalyzed thermal decomposition of hydrogen iodide would require high temperatures, in the range of 600°–700° C. In order to bring this decomposition into a desirable temperature range catalysis is employed. Hydrogen iodide is readily cleaved into hydrogen and iodine at temperatures in the range of 250°–700° C. more preferably 300°–450° C. over a variety of catalysts. Useful catalysts include metallic gold, platinum and palladium, the noble metals being most preferred. Photolysis is the alternative decomposition route, photolysis of hydrogen iodide being well known and thoroughly studied both in the gaseous state and in solution. Photolysis of the gaseous compound proceeds more readily than that of the solvated compound and consequently is preferred over photolysis of solvated hydrogen iodide. The photolysis proceeds readily in light at a wavelength of 400 nanometers or less.

The solid intermediate can be treated in a variety of ways. One method involves aqueous solvation of the recovered solid with subsequent decomposition to give an overall yield of water vapor, iodine and oxygen. Thus, the solvated intermediate is heated at about 200°–300° C. to decompose it into water vapor, iodine and oxygen. An alternative to solvation prior to decomposition is to pyrolyze the solid in situ. In this manner, water vapor, oxygen and iodine vapor are produced directly. Iodine can be solidified and collected and the water vapor condensed and oxygen is thereby produced in a very pure state. In still another route, the solid is simply solvated and concentrated in order to be used in further synthesis. In this manner, the oxygen from the water is stored in a usable solid form, as the intermediate is very strong oxidizing agent and readily gives up oxygen.

In those instances in which iodine vapor is formed from either hydrogen iodide or the intermediate it is readily collected by virtue of its characteristic of sublimation, allowing the iodine to be constantly recycled with a negligible overall loss of iodine.

The above described process will become more readily apparent from the following examples

EXAMPLE 1

A one foot glass pipe column is loaded with approximately 80 grams of 0.125 inches pelletized $CuI/Al_2O_3$ catalyst, as prepared in Example II below, and is then heated to about 400° C. Water vapor and iodine vapor are then passed through the column at a total flow rate of about 200 cc/min. (STP) while the column is maintained at 35 p.s.i.g.

The gaseous effluent formed by the reaction is passed through a heat exchanger and the condensed liquid is collected and analyzed for hydrogen iodide (pH measurement) and iodine ($S_2O_3^{--}$ titration). It is found that the effluent is acidic (a pH of 2), has no color and does not react with starch (no color). Upon treating the condensed liquid with an oxidizing solution, a brown color is developed instantly and addition of starch yields a blue complex characteristic of iodine.

The crystalline material left in the column after reaction is rinsed from the column with deionized water to yield a clear solution which gives a negative starch test for iodine. Addition of this solution is an iodide ion-containing solution yields a brown solution giving a positive starch test for iodine.

It is found that under the reaction conditions, the effluent contains hydrogen iodide while the crystalline material is iodic acid/iodine pentoxide.

EXAMPLE 2

The cuprous iodide/alumina catalyst of Example 1 is prepared by mixing together equal weights of catalyst grade alumina and commercially available cuprous iodide with a suitable die lubricant and then pelletizing into 0.125 inches catalyst pellets. The pellets are calcined at about 550° C. in nitrogen to convert the alumina to gamma alumina without oxidizing the cuprous iodide to cupric oxide. The resulting calcined catalyst pellets contain about 60% cuprous iodide, the balance being gamma alumina. The die lubricant, usually being an organic compound, leaves a small residue (<0.5%) of carbon.

EXAMPLE 3

In this example, the cuprous iodide is used in powder form.

A stream of argon is passed at a flow rate of about 200 cc/min., through a water scrubber and then through a two foot glass column containing alternate layers of commercially available cuprous iodide powder and glass beads. This packed catalyst bed is then hydrated at 170° C. for 16 hours. The reactor is brought up to temperature and iodine is loaded into it by passing argon over warmed iodine crystals (at about 85° C.) and then into the packed bed. The effluent of this reactor is periodically analyzed for iodine, iodide and iodate. Based on the 50 mmols of iodine subject to the experiment, 20 mmols are converted to iodide and the balance recovered as iodine. The iodate corresponding to the iodide is not detected in the effluent.

EXAMPLE 4

A 1.0M HI-deionized water solution is photolyzed at ambient room temperature with a high pressure mercury arc lamp. The rate of generation of elements is measured during the course of decomposition. A 0.13 meq./min. rate for iodine and hydrogen can be maintained for a period of about 24 hours. A 6.4M HI-deionized water solution is likewise photolyzed. In this case, the steady state rate is 2.70 meq. $I_2$ or $H_2$/min. Pressure in the reaction vessel continually increases (and is vented) indicating the formation of a non-soluble gas which when analyzed by mass spectroscopy proves to be hydrogen, as anticipated.

EXAMPLE 5

Gaseous hydrogen iodide is passed through a reactor tube packed with 0.1% palladium on gamma-alumina (Girdler 368B) catalyst at a temperature of 300°–450° C. The hydrogen iodide is readily decomposed into a gas and iodine vapor, which condenses on the walls of the reactor tube when the latter is at a temperature below the sublimation point of iodine. The gas exiting from the reactor tube is analyzed by mass spectroscopy and is found to be hydrogen. This decomposition is also carried out over platinum on asbestos catalyst and cupric chloride on alumina catalyst, with the same results.

EXAMPLE 6

Solid iodic acid is heated in a reaction vessel at a temperature of 210°–225° C. Thermal gravimetric analysis shows that at 225° C., there is a sample weight loss of 5% which is also the theoretical value for the loss of water. Upon continued heating, the weight of the sample remains stable to a temperature of 300° C., at which point further decomposition initiates. At a temperature of 400° C., the sample weight is reduced to zero, indicating complete decomposition. Differential thermal analysis information indicates endotherms at the two decomposition temperatures as is expected. Mass spectrographic analysis of a sample of iodic acid shows a cracking pattern determined by three different temperatures: 80°, 225° and 370° C. The low temperature peaks consist of water with a trace of iodine compounds, and the high temperature peak is a composite of iodine, oxygen and oxides of iodine.

I claim:
1. A process for producing hydrogen from water which comprises:
  a. reacting water vapor and iodine vapor in the presence of cuprous iodide at a temperature of 125° to 450° C. to form hydrogen iodide and a solid oxygen-iodine intermediate;
  b. recovering the hydrogen iodide formed in step (a); and
  c. thermally or photolytically decomposing said recovered hydrogen iodide into hydrogen and iodine, continuously collecting and removing the hydrogen so formed.

2. A process for cleaving water into hydrogen and oxygen which comprises:
  a. reacting water vapor and iodine vapor in the presence of cuprous iodide at a temperature of 125° to 450° C. to form hydrogen iodide and a solid oxygen-iodine intermediate;
  b. recovering the hydrogen iodide and solid intermediate formed in step (a);

c. thermally decomposing said recovered hydrogen iodide over a catalyst into hydrogen and iodine, continuously collecting and removing the hydrogen so formed;
d. solubilizing the recovered intermediate in water to form an aqueous solution; and
e. thermally decomposing said solution to obtain water vapor, oxygen and iodine, continuously collecting and removing the oxygen so formed.

3. The process of claim 2, where the temperature of decomposition of the solution of the intermediate is about 200°–350° C.

4. The process of claim 2, where the catalyst for the thermal decomposition of hydrogen iodide is one selected from platinum or palladium.

5. The process of claim 2, where the hydrogen iodide is thermally decomposed at a temperature of 300°–450° C.

6. A continuous process for cleaving water into elemental hydrogen and oxygen which comprises:
a. reacting water vapor and iodine vapor in the presence of cuprous iodide at a temperature of 125°–450° C. in a reactor to form hydrogen iodide and a solid oxygen-iodine intermediate;
b. recovering the hydrogen iodide and solid intermediate formed in step a);
c. photolytically decomposing the recovered hydrogen iodide into hydrogen and iodine, continuously collecting and removing the hydrogen so formed; and
d. thermally decomposing the recovered intermediate in situ in the reactor to form water vapor, iodine and oxygen, continuously collecting and removing the oxygen so formed.

7. The process of claim 6, where the hydrogen iodide is decomposed photolytically in light at a wavelength of about 400 nanometers or less.

* * * * *